C. SONNEMANN.
MULTIPLE SLICING MACHINE.
APPLICATION FILED APR. 21, 1919.
1,313,753.
Patented Aug. 19, 1919.
2 SHEETS—SHEET 1.
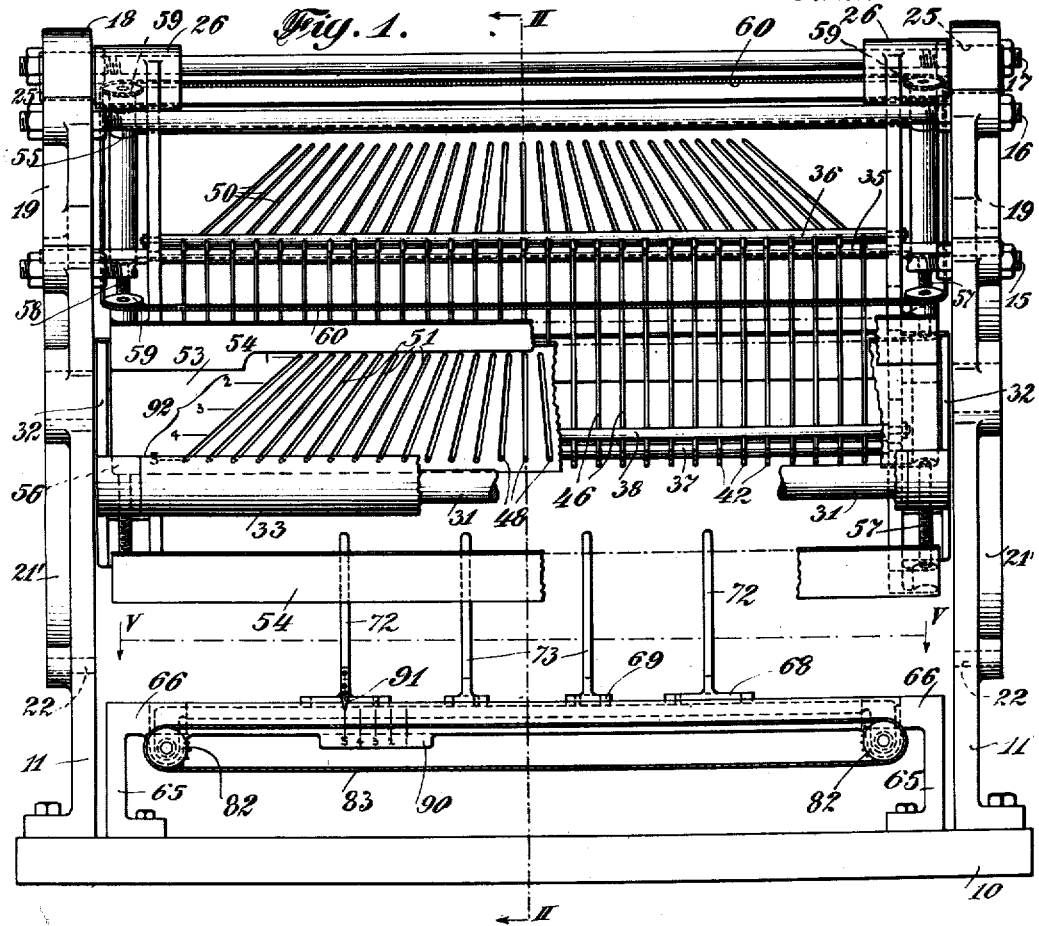
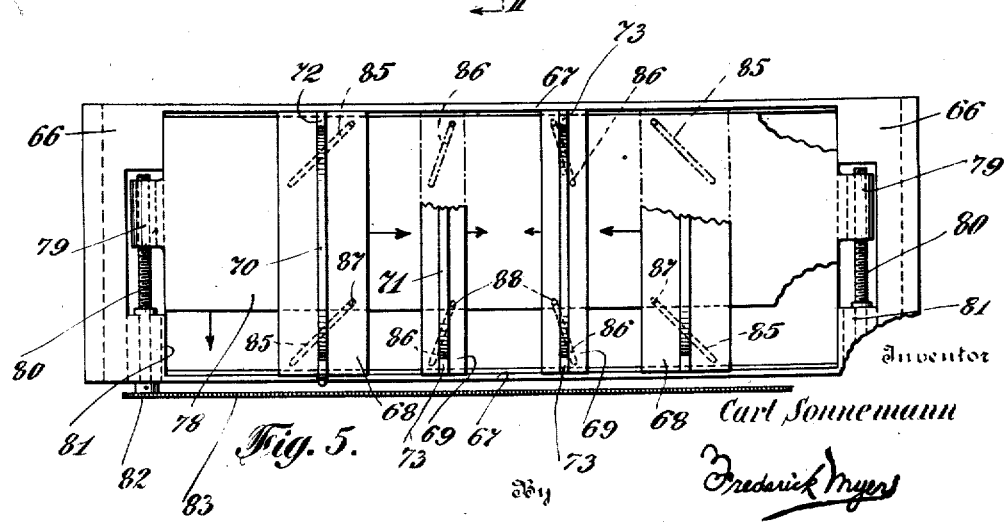
Inventor
Carl Sonnemann
By Frederick Myers
Attorney C. SONNEMANN.
MULTIPLE SLICING MACHINE.
APPLICATION FILED APR. 21, 1919.
1,313,753.
Patented Aug. 19, 1919.
2 SHEETS—SHEET 2.
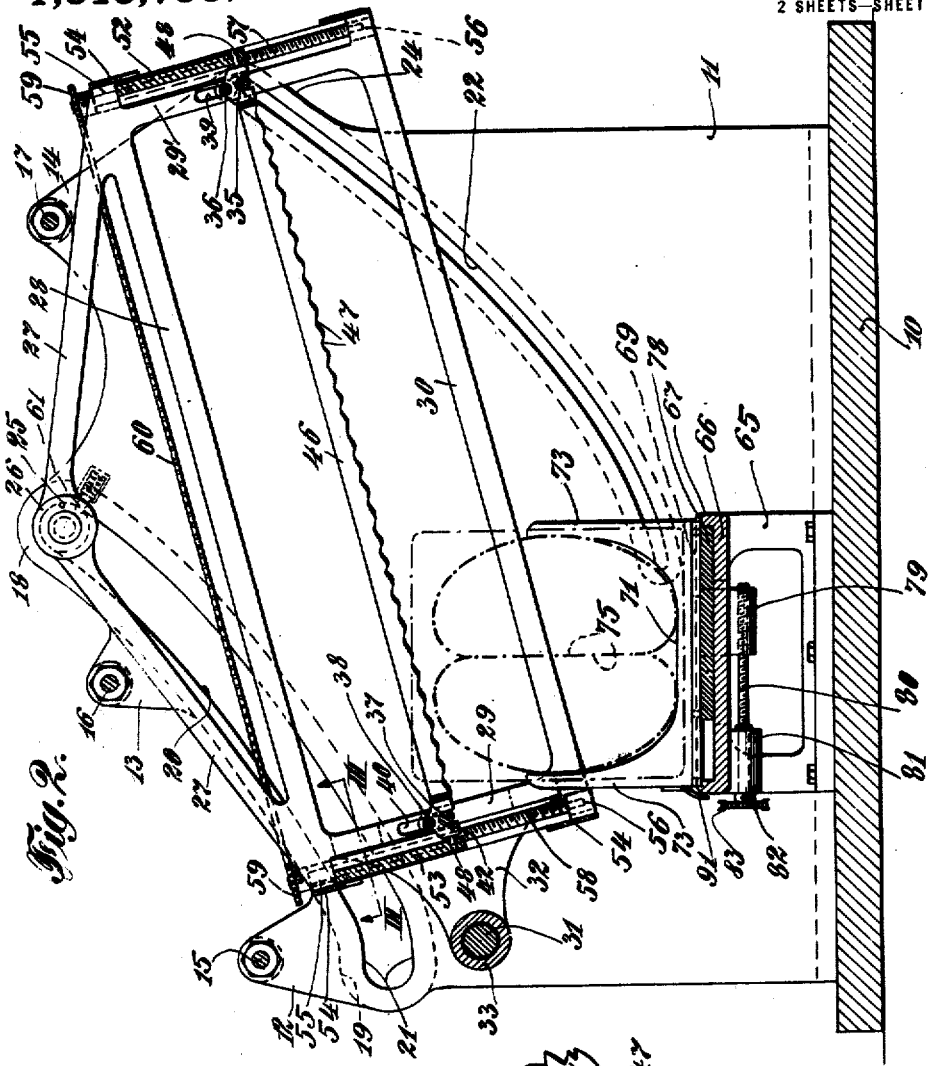
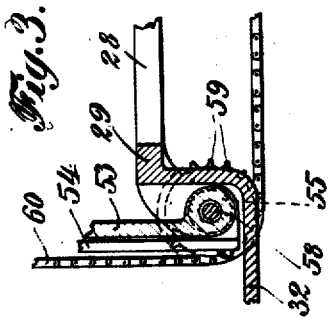
Inventor
Carl Sonnemann
By Frederick Myers
Attorney

UNITED STATES PATENT OFFICE.

CARL SONNEMANN, OF NEW YORK, N. Y.

MULTIPLE-SLICING MACHINE.

1,313,753.                    Specification of Letters Patent.       Patented Aug. 19, 1919.

Application filed April 21, 1919. Serial No. 291,485.

*To all whom it may concern:*

Be it known that I, CARL SONNEMANN, a citizen of Germany, residing in New York city, in the county of Bronx and State of New York, have invented certain new and useful Improvements in Multiple-Slicing Machines, of which the following is a specification.

This invention relates to improvements in multiple slicing machines, such as are used in hotels, restaurants and large dining rooms for cutting bread, cake, sausage, cheese and other like long and bulky food products into slices suitable for convenient service on dining tables.

One of the important objects is to provide a hand operated apparatus in which a large number of slices of elongated articles, as bread loaves, may be cut simultaneously by a single movement, two of the articles being sliced at one time, thereby doubling its normal capacity.

Another object is to provide means whereby the thickness of the slices may be uniformly regulated throughout the length of the articles as may be desired, such adjustment being positive and automatic for all of the cutters.

A further object is to mount the cutters so as to move in a peculiar shearing draw stroke manner, preventing crushing, breaking or crumbling of the article operated upon, and rendering the machine easy of operation.

These and other objects, which will become more fully apparent as the description progresses, are attained by the novel combination of parts and principles hereinafter described and shown in the accompanying drawings, forming a material part of this disclosure, and in which:—

Figure 1 is a front elevational view of a slicing machine made in accordance with the invention, parts being broken away to show the construction.

Fig. 2 is a transverse vertical sectional view taken on line 2—2 of Fig. 1.

Fig. 3 is a fragmentary sectional view taken on line 3—3 of Fig. 2.

Fig. 4 is a fragmentary perspective view of one of the cutter carrying blocks, and Fig. 5 is a horizontal sectional view taken on line 5—5 of Fig. 1.

Referring to the drawings, the numeral 10 designates a flat rectangular plate, constituting the base of the machine, upon opposite sides of which are securely bolted the flanged feet of a pair of upright frames 11, having on their irregular upper edges raised projections 12, 13 and 14, having lateral bosses in which are secured stay bolts 15, 16 and 17, the same being held in rigid adjustment by nuts at the inner and outer sides of the frames.

The inner surfaces of the frames are flat and level while the outer surfaces are thickened laterally at the mentioned projections and also at the central, highest projections 18, in which are the upper rear ends of arcuate slots 20, the same curving downwardly toward the front and terminating in short horizontal ends 21, the slots extending through the lateral pads 19.

Similar pads 21' are formed on the exterior of the frames, the same containing slots 22 substantially concentric with, but narrower than the slots 20, the slots 22 extending rearward from points slightly in advance of the vertical centers of the projections 18, into the rear extensions 24 of the frames.

Freely movable in the slots 20 are cylindrical stems 25, extending outward from heads 26, with which are formed pairs of arms 27 connected at their extremities by rails 28, similar rails 30 being disposed in parallel and joined at their ends by vertical bars 29, and 29', the combined elements appearing as open rectangular frames, connected together by a transverse bar 31 extending between bracket like plates 32 at the front sides of the bars 29, the bar 31 having disposed upon it a tubular handle 33 by which the frames are manipulated.

A rigid rod 35 passes through the rear bars 29', its ends extending into the slots 22 so as to serve as guides for the frames, while a similar but slightly shorter rod 37 passes through the front bars 29.

Disposed over the rods 35 and 37 are lock rods 36 and 38, the same being operably engaged in slots 39 and 40 formed in the bars 29 and 29' respectively.

Supported by the rods 35 and 37 are a plurality of thin blocks 42 having recesses 43 in their lower surfaces resting on the rods 35 and 37, while similar but shallower recesses 44 are formed in their upper surfaces adapted to receive the rods 36 and 38.

Narrow slits or kerfs 45 extend into the inner sides of each block, the same being adapted to receive the ends of the cutter blades or knives 46, their lower longitudinal edges 47 being formed undulatingly and keenly ground, the cutter blades being held by the screws 49.

Extending oppositely to the cutters are pins 48 engageable in elongated slots 50 and 51 formed in plates 52 and 53, respectively at the rear and front of the cutter carrying frame, the slots being uniformly spaced at their upper ends and diverging angularly from the center in both directions, in the manner of a fan, so that the pins 48 are always equally spaced but adjustable according to the vertical position of the plates 52 and 53.

These slot plates are movable in guides 54, attached to upper and lower extensions 55 and 56 of the bars 29 and 29' and are actuated by screws 57 and 58 rotatable in the extensions at the four corners of the cutter frame.

In order to rotate these screws uniformly and equally, there are attached to their upper ends sprocket wheels 59 over which is trained a chain 60 which may be hand operated to turn the screws, which move the slot plates up or down, causing the pins 48 and cutters 46 guided thereby to move toward or from each other uniformly, so that slices of different thickness may be cut by them.

In order to hold the cutter frame when in a raised or rearward position, spring impelled detents 61 are set in the frames 11, their points entering the upper portions of the slots 20 and engage with suitable depressions formed in the sides of the stems 25.

To remove one or more of the cutter blades, the rods 36 and 38 are raised and the blades, together with their blocks, lifted off the rods 35 and 37, whereupon the pins 48 may be easily freed from their slots.

Bolted on the base 10, between the uprights 11, is a support frame comprised of vertical standards 65, connected by a platform 66 having raised front and rear edges 67 which act as guides for pairs of transverse plates 68 and 69, each having raised central longitudinal strips 70 and 71, from the ends of which extend supports 72 and 73 adapted to engage between them bread loaves 75 or other articles to be sliced.

These several supports are made adjustable so as to clear the cutters 46 when moved down, the supports being shifted by means of a longitudinal plate 78, movable laterally in the platform 66, below the support elements 68 and 69, by reason of end projections 79, screw-threaded to receive the screws 80, carried in extensions 81 of the frame 66 at its front.

These screws have attached to their outer extending ends, sprockets 82, over which is trained a chain 83, so that motion is uniformly conveyed to the plate 78 by moving the chain by hand.

Formed in the lower surface of the support plates 68, near each of their ends, are diagonal slots 85, the slots in each plate being in parallel but oppositely disposed to the slots in the mating plates.

Similarly other slots 86, are formed in the inner pair of plates 69 but at a lesser angle.

Extending into these slots are pins, respectively 87 and 88, the pins being set near the marginal edges of the plate 78 in such manner as to move the supports relatively one to another when the screws 80 are actuated, the direction of movement being indicated by the arrows in Fig. 5.

On the front edge of the platform 66 is a short scale 90, here showing numerals 1 to 5, with which is registerable an index finger 91 carried by the front element of the support 72 so that its position may be ascertained, and the others as well, due to their operative connections.

A somewhat similar scale 92 is shown upon the front slot plate 53 (see Fig. 1) and when the pins 48, locating the cutters 46, are in register with any one of the scale lines 1 to 5, the index 91 must register with the corresponding numeral on the scale 90 in order to have the cutters clear the supports as they are operated.

It is to be understood that the shape of the supports or holders for the articles to be sliced may be varied to suit the work and that the number of cutters employed may be changed at will.

In operation, the articles having been entered when the cutter frame is at its highest point, the handle 33 is drawn forcibly forward, the guide slots 20 and 22 causing the frame and cutters to move downwardly and toward the front in a peculiar manner, each of the teeth or undulations 47 doing a proportionate part of the work by a shearing draw cut, conducive to smooth slicing without undue physical exertion on part of the operator.

The devices for adjusting the cutters at differently spaced distances and also the support elements in conformity therewith having been previousy fully described, it will be apparent that an operative and novel structure has been disclosed whereby articles may be rapidly and smoothly sliced in great quantities and that the thickness of the slices may be quickly varied as desired.

Having thus described my invention and set forth the manner of its construction, and application, what I claim as new and desire to secure by Letters Patent, is:—

1. In a multiple slicing apparatus, the combination with a rigid frame comprising base and side elements, said side elements containing pairs of spaced arcuate concentric slots, of a cutter frame, a plurality of cutters adjustably secured therein, extensions from said cutter frame engaged in the mentioned slots and means for manually actuating said cutter frame.

2. In a multiple slicing apparatus, the combination with a support frame, a cutter carrying frame operable therein, and means coöperative whereby said cutter frame is guided to move in an arcuate path, of rods extending transversely across said cutter frame at each end, blocks removably engaged with said rods, means for uniformly adjusting all of said blocks laterally, cutters fixed at their ends in oppositely disposed blocks and means for actuating said cutter frame.

3. In a multiple slicing apparatus, the combination with a support frame having raised sides, a cutter carrying frame operable between said sides, and means in said sides whereby said cutter frame is guided in an arcuate path, of plates extending across each end of said cutter frame, each of said plates having a plurality of radial slots diverging at their lower edges, rods fixed in said cutter frame parallel to said plates, blocks slidably engaged on said rods, cutters secured at their ends in opposite blocks, pins carried by said blocks engaged in the mentioned slots, and means for moving said slotted plates vertically whereby said pins, blocks and cutters are equally laterally adjusted.

4. In a multiple slicing apparatus, the combination with a pluraity of cutter blades, of blocks attached to the ends of each of said blades, support rods common to all of said blocks at each end of the blades, a supporting frame for said rods, locking rods in in said frame engageable with said blocks, projections extending from each of said blocks opposite to said blades, plates having slots diverging from the center at each end of said frame, said projections engaging in said slots, and means for uniformly actuating both of said plates whereby said blocks are moved laterally upon said rods.

5. In a multiple slicing apparatus, the combination with a cutter carrying frame, a plurality of cutters mounted therein and means for adjusting said cutters laterally in uniform spaced relation, of a platform, work supports adjustable thereon, means for moving said supports laterally maintaining an equal spaced relation, and indexes for determining the position of said work supports relative to the position of said cutters.

In testimony whereof I have signed my name to this specification.

CARL SONNEMANN.